Aug. 16, 1938.  J. G. ALDINGER  2,127,151
SEALED JOINT FOR ROTARY SHAFTS
Filed March 23, 1935  3 Sheets-Sheet 2
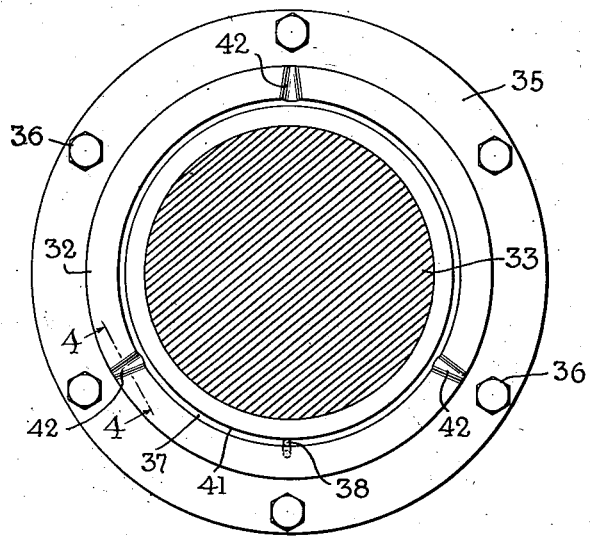
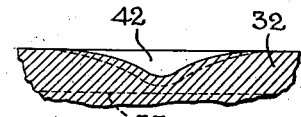
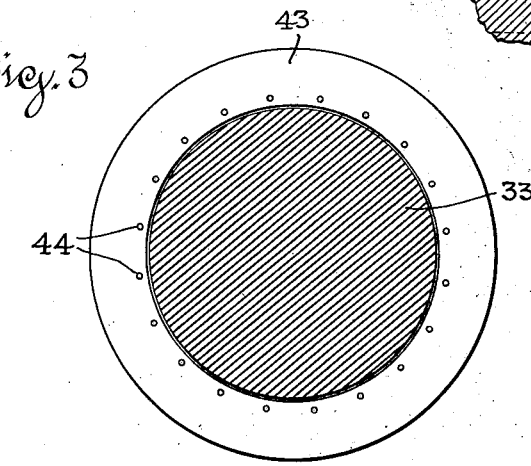
Inventor
Jacob G. Aldinger
By Dodge and Sons
Attorneys

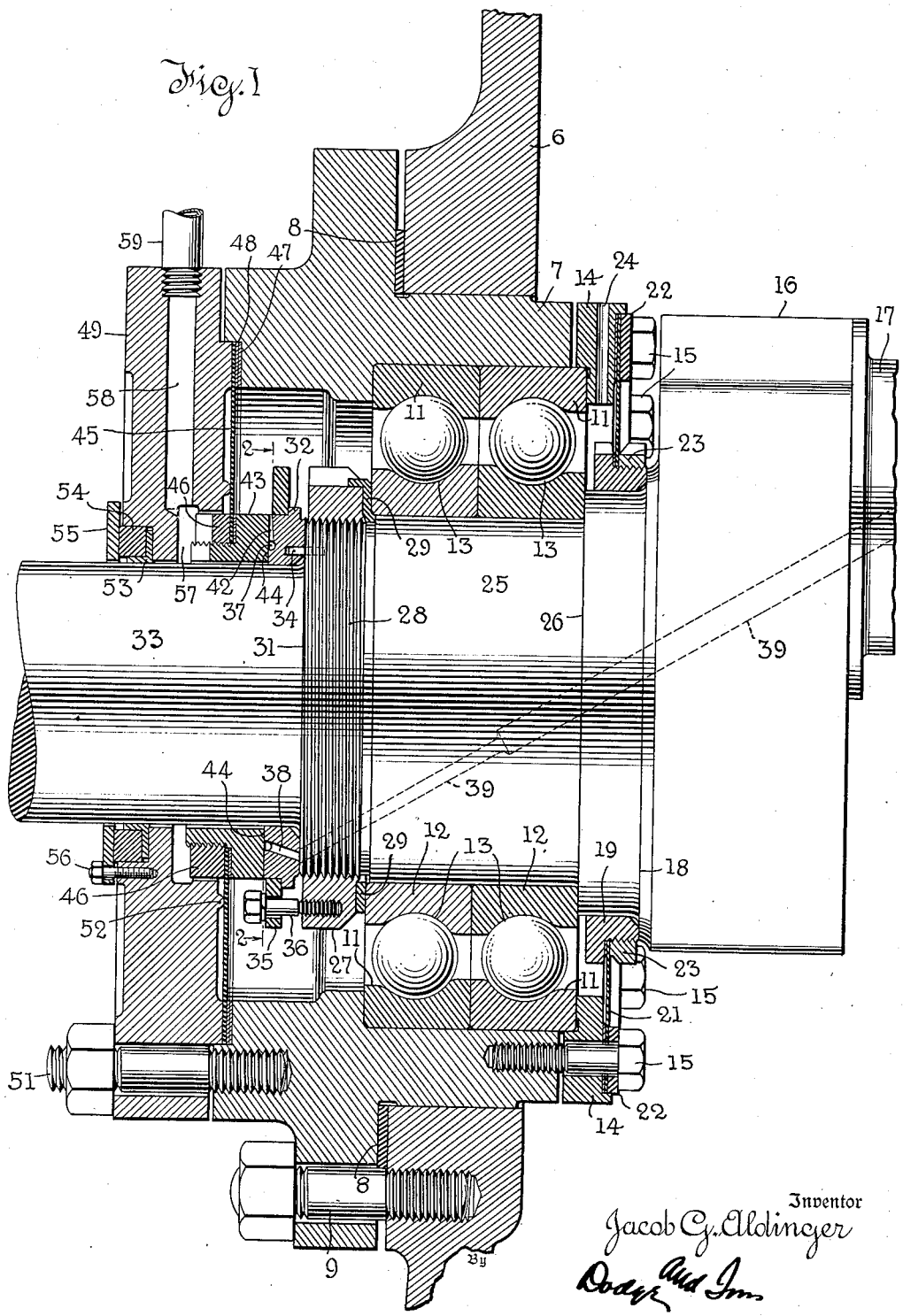

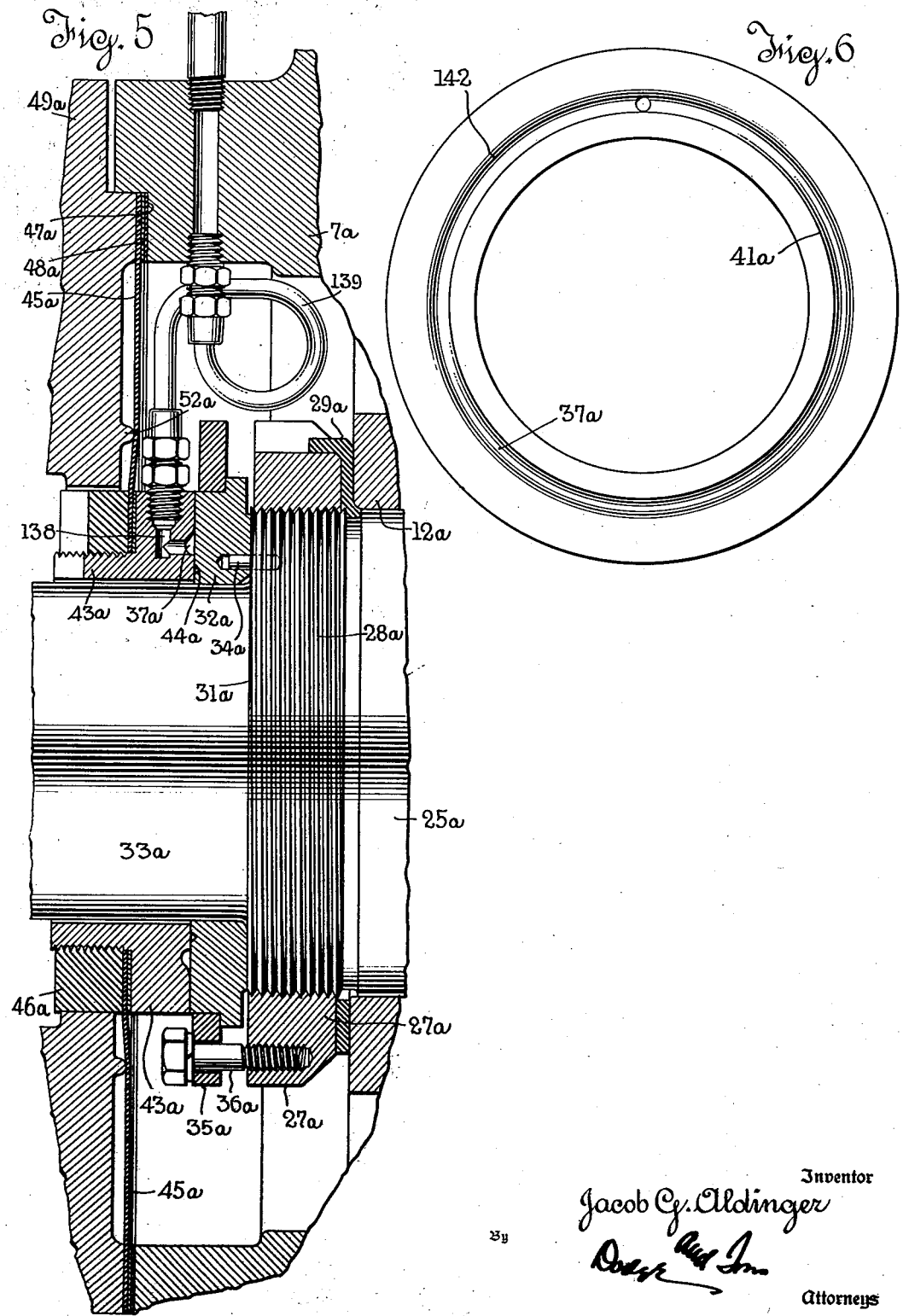

Patented Aug. 16, 1938

2,127,151

UNITED STATES PATENT OFFICE 2,127,151

SEALED JOINT FOR ROTARY SHAFTS

Jacob G. Aldinger, York, Pa., assignor to York Ice Machinery Corporation, York, Pa., a corporation of Delaware Application March 23, 1935, Serial No. 12,703

7 Claims. (Cl. 286—9)

This invention relates to gas-tight seals for rotary shafts, and more particularly to such seals as applied to the crank shafts of large compressors used in the refrigerating industry.

Such seals must be effective against a reversed fluid pressure differential, and must be highly efficient not only to prevent escape of the refrigerant, but also to prevent entrance of air into the refrigerating circuit.

There has been developed by applicant's assignee a type of seal in which two rings enter into face engagement, one of the rings being carried by an elastic plate diaphragm which coacts with an annular fulcrum in such a manner that a unidirectional thrust is developed between the two rings, irrespective of reversal of the fluid pressure differential acting on the diaphragm.

The invention, while applicable in some degree to other seals of the face-engaging ring type, has been developed particularly for the type of seal just mentioned, and will be described as so embodied.

One purpose of the invention is to keep the seal submerged in oil, irrespective of the level of oil in the crank case.

Another feature of the invention is the provision of means for positively supplying oil under little or no effective pressure to the mating surfaces of the sealing ring and to insure that the oil will be spread in an exceedingly thin film, so that the seal will not be impaired.

Another feature of the invention is the provision of means to resist the seepage of oil through the seal from the crank case outward.

Other features of the invention will be apparent as the description proceeds. It may be said that most of the features of the present invention were developed as the result of experience in an attempt to apply the diaphragm type of seal to larger compressors than those for which it was originally designed, and to meet requirements developed by the high lineal speed of the sealing rings and the severe friction producing conditions at times encountered with such relatively large compressors.

The invention will now be described with reference to the accompanying drawings, in which:—

Fig. 1 is an axial section through one of the bearings of the crank shaft of a large compressor.

Fig. 2 is a fragmentary section on the line 2—2 of Fig. 1, looking to the right relatively to Fig. 1.

Fig. 3 is a section on the same line, looking to the left relatively to Fig. 1.

Fig. 4 is an enlarged fragmentary section on the line 4—4 of Fig. 2 illustrating the form of the oil relief grooves formed in a sealing ring.

Fig. 5 is a fragmentary view similar to a portion of Fig. 1, showing a modified construction.

Fig. 6 is a face view of the non-rotating ring 5 used in such modified construction.

A portion of the crank case wall is indicated at 6, and mounted in this is the usual bushing 7 sealed by a gasket 8 and held in place by a plurality of studs 9 with the usual nuts. Retained in a counterbore in bushing 7 are two annular ball bearings, whose outer races are indicated at 11, and whose inner races are indicated at 12, the intervening balls being indicated at 13. The ball races 11 are held in the counterbore by a clamping ring 14 held by machine screws 15.

The crank shaft is of the usual form and includes one or more crank throws, a portion of one crank throw being indicated at 16 and a portion of one of the crank pins at 17. The shaft is provided with a shoulder 18 against which seats a sealing ring 19 intended to retain lubricant about the bearing. This ring is not a major element of the gas-tight seal. It is supported on elastic diaphragm 21 which is clamped to clamping ring 14 by a retaining ring 22 engaged by the heads of the machine screws 15 already described.

The inner margin of the diaphragm is clamped against a shoulder on the outer side of ring 19 by means of a retaining ring 23 threaded on ring 19. An oil overflow 24 is formed at the top of the clamping ring 14. The shaft is further reduced to form a cylindrical seat 25 for the inner races 12 which are locked against the shoulder 26 by a nut 27 which is screwed onto threads 28 formed on the shaft and locked in position by means of deformable lock washer 29.

Beyond the threaded portion 28 the shaft is further reduced to form a shoulder 31 against which a rotating sealing ring 32 is fixedly mounted. This sealing ring 32 makes a gas-tight fit with the portion 33 of the shaft and with shoulder 31 and is held against rotation by a stake 34. It is locked in position by a retaining ring 35 held by a number of machine screws 36, six such screws being indicated in Fig. 2.

The ring 32 on its outer face (left hand as viewed in Fig. 1) is provided with an annular groove 37. The port 38 leads through the body of the ring 32 and communicates with a drilled port 39 formed in the crank shaft and in communication with the force feed lubricating system of the compressor. Since the crank shaft bearings and crank pin bearings are lubricated by this system, this serves as the most convenient way to supply oil to the rubbing face of ring 32, but any source of oil might be used within the broad scope of the present invention.

The inner edge 41 of groove 37 is made as sharp as practicable to resist inward flow of oil. Extending radially outward from the groove 37 and in the outer or rubbing face of ring 32 are one or more tapered vent grooves 42, three being indicated in Fig. 2. The number depends somewhat on the size of the ring, and the capacity of supply port 38 under the pressure head used in the oiling system. The venting action should be such as substantially completely to dissipate the pressure head in annular groove 37. Where oil can be supplied under a quite low pressure head the vent grooves may sometimes be omitted. These vent grooves 42 are of the cross section indicated on an enlarged scale in Fig. 4, that is to say, the edges of the groove are not sharp, but the walls of the vent groove curve into tangency with the surface of the ring so that a portion of the oil flowing radially outward through the grooves 42 is spread as a very minute film between the contacting surfaces of the ring 32 and the mating ring 43 which will now be described.

Ring 43 has an inner face which enters into face engagement with the outer face of ring 32, and forms the major gas-tight seal. In this inner or sealing face of ring 43 are a circumferential series of pockets or countersinks 44 (see particularly Fig. 3) designed to retain oil. It should be observed that these countersinks 44 are not opposed to relief grooves 42, but are located radially inward relatively to the inner sharp edge 41 of groove 37, and hence are opposed to the smooth uninterrupted annular portion of the sealing face of ring 32 (see Fig. 1).

Ring 43 is clamped to the inner margin of an elastic plate diaphragm 45 of annular form. The connection between the diaphragm 45 and ring 43 takes the form of a clamping ring 46 which is threaded on ring 43 and clamps diaphragm 45 against a shoulder formed on ring 43.

The outer margin of diaphragm 45 is mounted in a countersunk seat 47 formed in bushing 7, a suitable number of annular plate shims 48 being interposed to secure proper positioning of the diaphragm 45. A retainer ring 49 is held to bushing 7 by studs 51 with the usual nuts, and thus clamps the outer margin of the diaphragm in sealing relation with the bushing 7.

Formed on the inner face of retainer ring 49 is an annular bead 52 concentric with the shaft. The shaft is permitted no appreciable movement in the direction of its axis and bead 52 is so located (by proper selection of shims 48) that it engages the outer face of diaphragm 45 and, serving as an annular fulcrum, subjects the diaphragm to a slight annular flexure. The diameter of the bead is such that it subdivides diaphragm 45 into two concentric annular areas proportioned according to principles characteristic of this type of seal.

These general principles may be briefly summarized. When the fluid pressure in the crank case is higher than atmospheric pressure, the resulting differential fluid pressure acting on the outer annular area overpowers the differential fluid pressure acting on the inner annular area. The resultant effect is such flexure of the diaphragm as will force ring 43 inward toward ring 32 sufficiently to maintain the seal. When the atmospheric pressure is higher than crank case pressure, the resulting differential acts inward on the entire area of the annular diaphragm 45 and urges ring 43 toward ring 32 with sufficient force to maintain the seal. When crank case pressure is equal to atmospheric pressure, the sealing contact between the rings 43 and 32 is maintained because bead 52 places the diaphragm under slight elastic stress.

Mounted in a countersink on the outer side of ring 49 is a conventional packing made up of rings 53, 54 and retainer ring 55 held by studs 56. This forms a secondary seal with the shaft, useful in case of rupture of diaphragm 45. An annular chamber 57 is formed in ring 49 between the outer side of ring 43 and diaphragm 45 on the one hand and the seal formed by rings 53 and 54 on the other. Chamber 57 is vented to atmosphere by passage 58 and pipe 59, the pipe leading preferably to a point outside the building in which the compressor is housed. In this way discharge of refrigerant into the compressor room is precluded in the rare case of rupture of the diaphragm 45.

The operation of the device will be apparent from the description already given. While the vent ports 42 are used primarily to dissipate pressure in groove 37 in cases where the oil supply is under substantial pressure head, they do assist in feeding oil to the mating area, and do assist the flow of oil by centrifugal action on the oil in ports 42. Hence they may be used with good effect in cases where the oil is supplied under such low pressure head that their venting action is of no importance.

A modified embodiment intended for use where oil is supplied under low pressure head (gravity flow for example), is illustrated in Figs. 5 and 6. Only the essential elements of the seal are illustrated. Ancillary features may be included as in Fig. 1.

Parts similar to parts in Figs. 1 to 4 are similarly numbered with the letter *a* and require no detailed description. In Figs. 5 and 6, the groove 37*a* is formed in the face of the non-rotating ring 43*a* and the countersinks 44*a* are formed in the face of the rotating ring 32*a*. This is the reverse of the arrangement shown in Figs. 1 to 4. No vent grooves similar to 42 of Figs. 1 to 4 are used. Instead the groove 37*a* (which has as before, the sharp inner edge 41*a*) has a flaring outer edge 142.

Oil is supplied to groove 37*a* through a coiled flexible pipe 139 which leads to a port 138 in ring 43*a* and communicating with groove 37*a*. The oil is supplied under low pressure and may be supplied by gravity flow.

In both constructions described oil is supplied to a middle annular area in the mating faces of the rings and means are provided to resist radial flow in one direction and favor such flow in the opposite direction. The curved outer margin 142 of groove 37*a* (Figs. 5–6) is functionally similar in a degree to the vent ports 42 (Figs. 1–4) because it favors outward flow and ensures outward oil distribution.

Seals provided with lubricating means as above described are characterized by tightness and satisfactory operation over long periods without service attention. Without intending to limit myself to a particular theory of operation, the basis on which the design was developed will be outlined.

A lubricating oil has substantial viscosity. If applied in a very thin film, it will not impair the seal between two rubbing surfaces. However, if the oil be subject to pressure head and if substantial oil pressure be allowed to develop between the rings, the resulting separation of the rings and attendant thickening of the oil layer will permit leakage through the seal. Clearly, the capillary and surface tension effects in a thin film of oil are controlling factors in the maintenance of the seal, and are destroyed if the film becomes too thick.

In the arrangement shown in Figs. 1 to 4, the oil is supplied under pressure head but, as described above, the vent grooves are sufficient to dissipate this pressure head, so that little or no separating pressure is developed between the sealing rings. Further, the formation of the vent grooves in such a way that they merge into the sealing face is favorable to the maintenance of a very thin film of oil between the outer annular areas of the two rings. This film causes and limits the actual separation of the rings. The inner annular area of the rings which is not traversed by the vent grooves, is lubricated by a capillary flow. The oil inherently tends to enter between the rings for a limited depth through the capillary effect developed by the separation of the rings.

The sharp inner edge on the annular groove resists entering flow and hence inhibits the entrance of oil in greater quantities than that incident to the capillary effect. Tests have shown that a truly sharp edge offers substantial resistance to the entrance of oil, whereas if the edge be filleted on a radius of even a few thousandths of an inch, the entrance of oil is very strikingly promoted. The extent of the differentiation as to the entrance of oil which can be secured by sharpening one edge and filleting the other is much greater than would appear on casual consideration.

Where the oil is supplied under little or no pressure head, it is possible, but not necessary, to dispense with the vent groove or grooves. Consequently, a structure such as shown in Figs. 5 and 6, omitting the vent groove can be made to give a useful result and is believed to operate according to the principles above set forth.

In both embodiments of the invention illustrated the outer annular area, through which the entrance of oil is facilitated, is believed to determine the actual separation of the sealing surfaces and to hold this separation within the limits in which the viscosity of the oil is effective to preserve the seal.

What is claimed is:—

1. The combination of a pair of sealing rings in face contact with each other, one of said rings being carried by and encircling a rotating shaft and the other of said rings also encircling said shaft and being supported by an elastic diaphragm which holds it against rotation; a fulcrum engaging said diaphragm and so arranged that irrespective of reversals of fluid pressure differential acting on the diaphragm, the diaphragm urges the ring supported thereby toward the other ring; means for conducting oil under low effective pressure to an annular area substantially at the middle of the area of contact of the two rings; means for resisting flow of oil from said middle area toward one margin of the area of contact of the rings; and means comprising channels formed in the face of one ring for permitting flow from said middle area to the other margin of the area of contact of the rings.

2. The combination of a pair of sealing rings in face contact with each other, one of said rings being carried by and encircling a rotating shaft and the other of said rings also encircling said shaft and being supported by an elastic diaphragm which holds it against rotation; a fulcrum engaging said diaphragm and so arranged that irrespective of reversals of fluid pressure differential acting on the diaphragm, the diaphragm urges the ring supported thereby toward the other ring; means for conducting oil under low effective pressure to an annular area substantially at the middle of the area of contact of the two rings; means for resisting flow of oil from said middle area toward one margin of the area of contact of the rings; means comprising channels formed in the face of one ring for permitting relief flow from said middle area to the other margin of the area of contact of the rings; and means comprising a barrier provided with an overflow for maintaining a bath of oil which submerges said rings, and is fed by such relief flow.

3. Means for lubricating the mating faces of a rotary seal of the type comprising two relatively rotatable rings yieldingly urged into sealing engagement with one another, said means comprising an annular channel formed in at least one of said rings and dividing the mating areas thereof into two portions, there being at least one vent groove leading from said channel across one of said portions and serving substantially to dissipate pressure head in said channel, the vent groove being so formed as to spread oil in a tenuous film between the mating surfaces; and means for conducting oil to said channel.

4. Means for lubricating the mating faces of a rotary seal of the type comprising two relatively rotatable rings yieldingly urged into sealing engagement with one another, said means comprising an annular channel formed in at least one of said rings and dividing the mating areas thereof into two portions, there being at least one vent groove leading from said channel across one of said portions and serving substantially to dissipate pressure head in said channel, the vent groove being so formed as to spread oil in a tenuous film between the mating surfaces; means for conducting oil to said channel; and oil retaining means having an overflow, so arranged as to retain vented oil in sufficient depth to submerge said seal.

5. Means for lubricating a rotatable seal of the type in which a pair of relatively rotatable sealing rings are yieldingly urged into face engagement with one another, comprising an annular channel formed in the face of one of said rings and subdividing their mating areas into two distinct portions; means for conducting oil under hydrostatic pressure to said channel; and at least one vent groove leading from said channel across one only of said portions, said groove being of sufficient capacity substantially to dissipate hydrostatic pressure between the rings and so formed as to merge gradually into the mating surfaces, whereby the oil is distributed between the mating surfaces in an extremely tenuous film.

6. The combination defined in claim 5 in which the vent groove leads across the outer of said portions, and the edge of the groove adjacent the inner of said portions is sharp to resist the entrance of oil.

7. The combination defined in claim 5 in which there are oil retaining pockets in that one of the two portions of the mating areas which is not traversed by the vent groove.

JACOB G. ALDINGER.